US008656553B2

(12) United States Patent
Okuhara et al.

(10) Patent No.: US 8,656,553 B2
(45) Date of Patent: Feb. 25, 2014

(54) GROMMET FOR WIRE HARNESS

(75) Inventors: Takashi Okuhara, Yokkaichi (JP); Tsutomu Sakata, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 13/522,571

(22) PCT Filed: Nov. 17, 2010

(86) PCT No.: PCT/JP2010/070434
§ 371 (c)(1),
(2), (4) Date: Jul. 17, 2012

(87) PCT Pub. No.: WO2011/121838
PCT Pub. Date: Oct. 6, 2011

(65) Prior Publication Data
US 2012/0291220 A1    Nov. 22, 2012

(30) Foreign Application Priority Data
Mar. 31, 2010   (JP) ................................ 2010-081804

(51) Int. Cl.
*H02G 3/22*   (2006.01)
*F16L 5/00*   (2006.01)

(52) U.S. Cl.
USPC ............................................... 16/2.2; 16/2.1

(58) Field of Classification Search
USPC .............. 16/2.1, 2.2, 2.5; 174/152 R, 152 G, 174/153 G, 154, 167, 650, 659, 660, 668; 277/602, 606, 608; 248/56, 68.1, 74.1, 248/74.2, 74.3, 231.9
See application file for complete search history.

(56) References Cited

U.S. PATENT DOCUMENTS

| 2,912,712 | A | * | 11/1959 | Shamban et al. ................. 16/2.1 |
| 5,739,475 | A | * | 4/1998 | Fujisawa et al. .......... 174/153 G |
| 6,051,795 | A | * | 4/2000 | Fisher et al. .............. 174/153 G |
| 6,088,876 | A | * | 7/2000 | Daoud ............................ 16/2.2 |
| 6,339,196 | B1 | * | 1/2002 | Uchida ..................... 174/153 G |
| 6,486,400 | B1 | * | 11/2002 | Smutny et al. ................ 174/651 |
| 6,541,703 | B2 | * | 4/2003 | Nakata .......................... 174/650 |

(Continued)

FOREIGN PATENT DOCUMENTS

| JP | 9-63385 | 3/1977 |
| JP | 7-245031 | 9/1995 |

(Continued)

*Primary Examiner* — Chuck Mah
(74) *Attorney, Agent, or Firm* — Greenblum & Bernstein P.L.C.

(57) ABSTRACT

Waterproof performance of a grommet is stabilized, the grommet being inserted and engaged with a through-hole having a burring in a body panel. A grommet for a wire harness is externally fitted to the wire harness routed in a vehicle and is mounted to a through-hole from which a burring of a body panel projects. The grommet includes a one-piece molded component of one of rubber and elastomer and an annular body engagement recess in an outer peripheral surface of a tubular portion through which the wire harness is inserted. A size between two side surfaces that define a bottom surface of the body engagement portion is set to be less than a projection size of the burring projecting from a periphery of the through-hole. A projecting front end surface of the burring is wedged in and pressed into contact with one of the side surfaces to serve as a seal point.

2 Claims, 5 Drawing Sheets

(56) References Cited

U.S. PATENT DOCUMENTS

| | | |
|---|---|---|
| 6,603,078 B2 * | 8/2003 | Okuhara et al. .......... 174/153 G |
| 6,685,195 B2 * | 2/2004 | Uchida et al. ................ 277/628 |
| 7,026,549 B1 * | 4/2006 | Smutny et al. ................ 248/56 |
| 7,189,930 B2 * | 3/2007 | Murakami .................... 174/650 |
| 2010/0139035 A1 * | 6/2010 | Magennis et al. ............. 16/2.1 |

FOREIGN PATENT DOCUMENTS

| | | |
|---|---|---|
| JP | 7-296660 | 11/1995 |
| JP | 9-129064 | 5/1997 |
| JP | 2005-80489 | 3/2005 |
| JP | 2009-296742 | 12/2009 |

* cited by examiner

PRIOR ART

PRIOR ART

GROMMET FOR WIRE HARNESS

TECHNICAL FIELD

The present invention relates to a grommet for a wire harness routed in a vehicle, particularly a grommet that ensures sealing performance even with a variation in projection and curvature of a burring that projects from a periphery of a through-hole with which the grommet is engaged in a body panel.

BACKGROUND ART

A wire harness is routed through a through-hole in a body panel that partitions an area exposed to water and a passenger cabin in a vehicle. A grommet composed of rubber or elastomer is mounted on the wire harness and is engaged with an inner periphery of the through-hole to shield the passenger cabin from water.

In many cases, a larger through-hole in the body panel to which the grommet is attached is provided with a burring hole having a burring B that projects to one side from a periphery of a through-hole H, as shown in FIG. 6(A).

In a case where the through-hole H in a body panel P is such a burring hole, a grommet 100 to be inserted and engaged with the through-hole H has an annular body engagement recess 112 and a seal lip 113, as shown in FIGS. 6(A) and (B), the body engagement recess 112 being provided in an outer periphery of a large diameter side of a diameter-increasing tubular portion 111 that extends from a small-diameter tubular portion 110 through which a wire harness 101 is tightly attached and inserted, the seal lip 113 being provided in a bottom surface 112a of the body engagement recess 112. The bottom surface 112a of the body engagement recess 112 is interposed between a side wall 112b of an inclined wall 115 and a side wall 112c of a front end thick portion 116.

To attach the grommet 100 to the through-hole H, the small-diameter tubular portion 110 of the grommet 100 is inserted through the through-hole H of the body panel P; the inclined wall 115 that defines the bottom wall 112a of the body engagement recess 112 is compressed and deformed to set a burring B of the through-hole H into the body engagement recess 112; and the seal lip 113 is pressed against an inner peripheral surface of the burring B. A point where the seal lip 113 is pressed against the burring B is referred to as a seal point SP.

With the burring B projecting from the periphery of this type of through-hole H, the height (projection amount) of the burring varies, and so does the radius from the periphery of the through-hole H. Thus, it is necessary to design a grommet in consideration of differences and variations of the height of the burring, the curvature of the radius, and the inner diameter of the through-hole.

In addition, a radius portion Br of the burring B rides on the seal lip 113, as shown in FIG. 6(C), making it difficult to control required seal pressure. Furthermore, due to a difficulty in securing a large overlap amount in consideration of a variation in the projection amount of the burring B, the seal lip 113 is relatively large. Thus, an "engagement amount A" of the grommet 100 to the burring B is insufficient, likely to lead to an insufficient gripping force. With a large "engagement amount A" and a large projection amount of the inclined wall 115, however, an insertion force to insert the grommet 100 into the through-hole H is increased.

A conventional grommet to be attached to a through-hole H having a burring B is disclosed in Japanese Patent Laid-Open Publication No. H9-63385. With reference to FIGS. 7(A) and (B), the grommet 200 is a two-piece component that includes an outer member 201 composed of an elastic material, such as rubber, and an inner member 202 composed of a resin molded component. A projecting end surface Ba of the burring B projecting from the periphery of the through-hole H is pressed against a hole end contact portion 201a of the outer member 201, and a lip pressing portion 202a of the inner member 202 is inserted into the hole end contact portion 201a of the outer member 201. In addition, the burring B is pressed by the inner member 202 from the periphery of the through-hole, and is thus held between the outer member 201 and the inner member 202 to maintain sealing performance.

CITATION LIST

[Patent Literature]
   Japanese Patent Laid-Open Publication No. H9-63385

SUMMARY OF INVENTION

Technical Problem

The grommet shown in FIG. 7 is a two-piece component that includes the outer member composed of a rubber molded component and the inner member composed of a resin molded component. In addition, both the outer member and the inner member have complex shapes, thus increasing assembly work and cost.

An object of the present invention is to provide a grommet inserted and engaged with a through-hole having a burring, the grommet being composed only of a rubber or elastomer molded component, having a simple shape, and ensuring waterproof performance even with a variation in the burring.

Solution to Problem

In view of the circumstances, the present invention provides a grommet for a wire harness, the grommet being externally fitted to the wire harness routed in a vehicle and being mounted to a through-hole from which a burring of a body panel projects, the grommet including a one-piece molded component of one of rubber and elastomer; and an annular body engagement recess in an outer peripheral surface of a tubular portion through which the wire harness is inserted. The bottom surface of the body engagement recess is provided with one of an inclined bottom surface portion and an arcuate bottom surface portion having a bottom surface inclined linearly or arcuately and projecting toward one of side surfaces, and a projecting front end surface of the burring is wedged in and pressed into contact with one of the inclined bottom surface portion and the arcuate bottom surface portion to serve as a seal point.

According to the present invention, the projecting front end surface of the burring as a seal point is pressed into contact with the inclined bottom surface portion or the arcuate bottom surface portion at the bottom surface of the body engagement recess to serve as a seal point.

In the grommet, it is preferred that the two side walls that define the bottom surface of the body engagement recess be perpendicular side walls orthogonal to the axis direction of the grommet and that a seal lip project from an outer front end of one of the perpendicular side walls in contact with the projecting side of the inclined bottom surface portion or the arcuate bottom surface portion toward the other perpendicular side surface.

In the grommet according to the present invention, the body engagement recess needs to have the shape described above, while the shape of other portions is not limited in particular.

Specifically, it is preferred to provide the small-diameter tubular portion through which the wire harness is tightly attached and inserted, the diameter-increasing tubular portion extending from the small-diameter tubular portion and having an increasing diameter, and the annular body engagement recess on the large diameter side of the diameter-increasing tubular portion. It is preferred that the body engagement recess be provided between the inclined wall increasing in diameter from the small-diameter tubular portion and the thick wall in the front end portion on the large-diameter side.

Advantageous Effects of Invention

According the present invention, the projecting front end surface of the burring is wedged in and pressed against the inclined bottom surface portion or the arcuate bottom surface portion projecting toward one of the side surfaces of the body engagement recess, and thus the front end surface of the burring serves as a seal point.

With the front end surface of the burring serving as the seal point, the projection size (height) of the burring is controlled without being affected by a variation in the radius of the burring, thus facilitating design of the grommet and achieving stable waterproof performance.

DESCRIPTION OF EMBODIMENTS

A grommet according to an embodiment of the present invention is described below with reference to the drawings.

Figure 1:
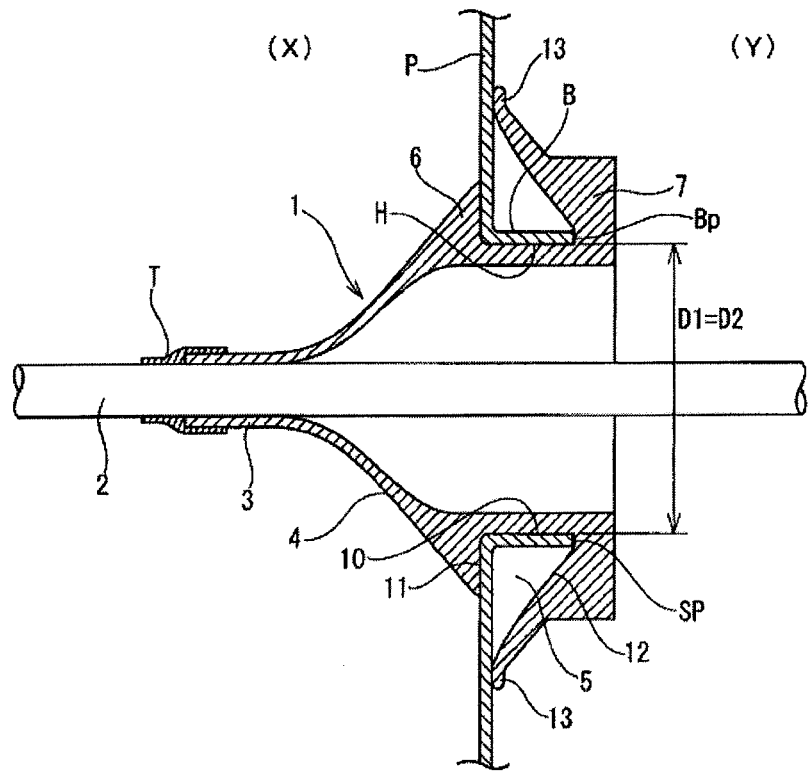
[FIG. 1] A cross-sectional view of a grommet according to a reference embodiment of the present invention in a state of being inserted and engaged with a through-hole having a burring in a body panel.
Figure 2:
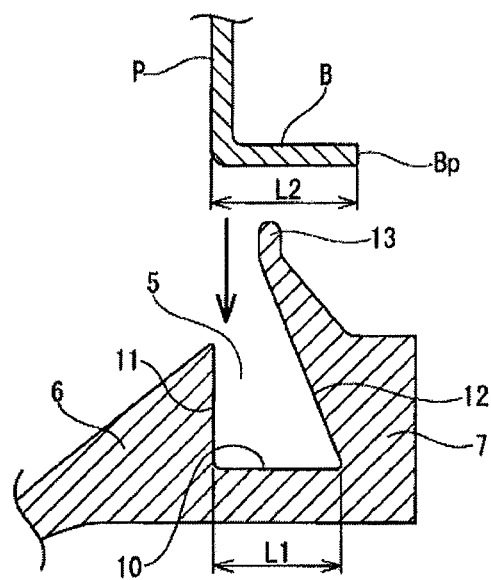
[FIG. 2] An enlarged cross-sectional view of a main portion of the grommet of FIG. 1.

FIGS. 1 and 2 each illustrate a grommet according to a reference embodiment.

With reference to FIG. 1, a grommet 1 is inserted and engaged with a through-hole H having a burring provided in a body panel P that partitions an engine compartment (X) and a passenger cabin (Y). Specifically, the burring B projecting from the through-hole H is inserted and engaged with an annular body engagement recess 5 provided in an outer peripheral surface of the grommet.

The grommet 1 is a one-piece component molded of a rubber or elastomer elastic body. In the present embodiment, the grommet 1 is composed of EPDM. The grommet 1 has a small-diameter tubular portion 3, a diameter-increasing tubular portion 4, and a body engagement recess 5. A wire harness 2 is tightly attached and inserted through the small-diameter tubular portion 3. The diameter-increasing tubular portion 4 increases its diameter from one end of the small-diameter tubular portion 3. The body engagement recess 5 having an annular shape is provided on a large diameter side of the diameter-increasing tubular portion 4. The body engagement recess 5 has a bottom surface 10 interposed between a perpendicular side wall 11 and an inclined side wall 12. An outer peripheral side of the inclined side wall 12 is inclined toward the perpendicular side wall 11. A seal lip 13 is provided at an end of the inclined side wall 12.

The body engagement recess 5 is provided between an inclined wall 6 of the small-diameter tubular portion 3 and a thick wall 7 of an end portion on a large diameter side. The perpendicular side wall 11 is provided to the inclined wall 6 and the inclined side wall 12 is provided to the thick wall 7.

A size L1 between the perpendicular side wall 11 and the inclined side wall 12 in a position in contact with the bottom surface 10 is set to be less than a size L2 between the body panel P and the end of the burring B (projection height of the burring B). Specifically, it is set as L1<L2, and preferably as L1=(0.6 to 0.9)×L2.

An outer diameter D1 of the annular bottom surface 10 is set to be equal to a hole diameter (inner diameter) D2 of the burring B.

The small-diameter tubular portion 3 is expanded by an expanding tool (not shown in the drawing) to insert the wire harness 2 through the small-diameter tubular portion 3 and the diameter-increasing tubular portion 4, and the grommet 1 is externally fitted to the wire harness 2. An adhesive tape T is then wound around an outer peripheral surface of the small-diameter tubular portion 3 through an outer peripheral surface of the wire harness 2 to fix the grommet 1.

To insert the wire harness 2 through the through-hole H in the body panel P and insert and engage the grommet 1 with the through-hole H, the small-diameter tubular portion 3 is first inserted into the through-hole H; the inclined wall 6 is compressed and deformed; and then the burring B on the periphery of the through-hole H is set into the body engagement recess 5 for engagement.

Specifically, as shown in FIG. 1, the inner peripheral surface of the burring B set into the body engagement recess 5 is in contact with the bottom surface 10 of the body engagement recess 5 and the body panel P on the periphery of the through-hole H is in contact with the perpendicular side wall 11. A projecting front end surface Bp of the burring B is wedged in and pressed into contact with the inclined side wall 12 in a back end portion (portion in contact with the bottom surface 10) of the inclined side wall 12. Specifically, the contact point between the front end portion Bp of the burring B and the inclined side wall 12 is a seal point SP.

Since the size LI between the perpendicular side wall 11 and the inclined side wall 12 is set to be less than the projection size L2 of the burring B, the front end surface Bp of the burring B can surely be wedged in and pressed into contact with the inclined side surface to achieve stable waterproof performance. Furthermore, the grommet can be designed easily without being affected by the radius and a variation thereof of the burring B.

In addition, the grommet is composed of a one-piece component formed of rubber or elastomer, as opposed to a two-piece component as disclosed in Patent Literature 1, thus being provided inexpensively.

Figure 3A:
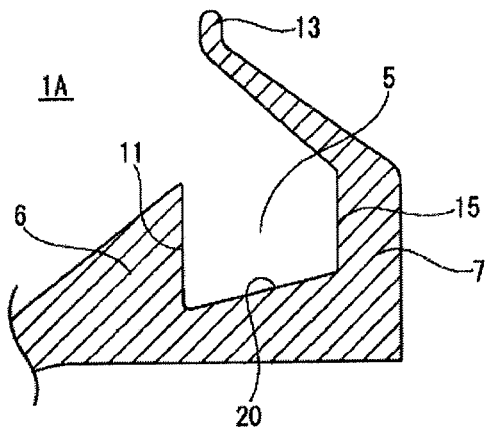
[FIG. 3] (A) An enlarged cross-sectional view of a main portion of a grommet according to an embodiment of the present invention. (B) An enlarged cross-sectional view of the main portion of the grommet engaged with a through-hole having a burring.
Figure 3B:
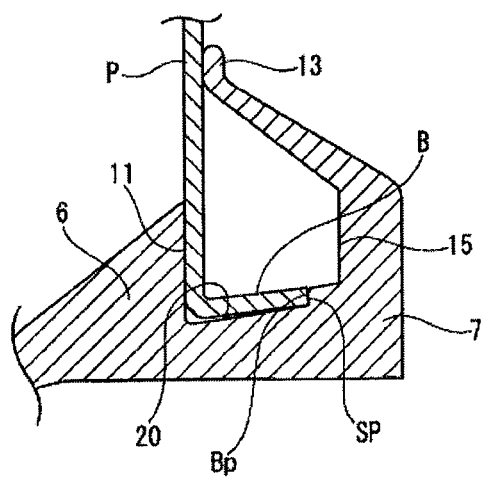

FIGS. 3(A) and (B) each illustrate a grommet 1A according to a first embodiment of the present invention.

In the grommet 1A, two side walls that define a bottom surface of a body engagement recess 5 are provided in parallel as perpendicular side walls 11 and 15.

The perpendicular side wall 11 is provided to an inclined wall 6 and the perpendicular side wall 15 is provided to a thick wall 7.

An inclined bottom surface portion 20 is provided to a bottom surface of the body engagement recess 5, the inclined bottom surface portion 20 being linearly inclined and projecting from the perpendicular side wall 11 toward the other perpendicular side wall 15.

A seal lip 13 projects from an outer end of the perpendicular side wall 15 toward the perpendicular side wall 11.

In the grommet 1A of the first embodiment, a front end surface Bp of a burring B is wedged in and pressed into contact with the inclined bottom surface portion 20. One surface of a body panel P is in contact with the perpendicular side wall 11 and the other surface is press-fitted by the seal lip 13 of the perpendicular side wall 15.

In the grommet of the first embodiment, even with a variation in projection amount of the burring B, the front end surface Bp thereof is surely wedged in and pressed into contact with any position of the inclined bottom surface portion 20 to serve as a seal point SP, thus ensuring stable waterproof performance.

Figure 4:
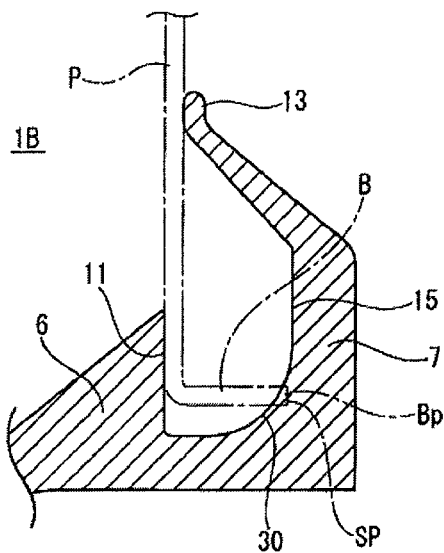
[FIG. 4] An enlarged cross-sectional view of a main portion of a grommet according to a modification of the embodiment above.

FIG. 4 illustrates a grommet 1B according to a modification example of the first embodiment.

Instead of the inclined bottom surface portion, the grommet 1B has an arcuate bottom surface portion 30 projecting toward the perpendicular side wall 15 in the bottom surface of the body engagement recess 5.

Thus, even with the arcuate bottom surface portion 30, the front end surface Bp of the burring B can be wedged in and pressed into contact with the arcuate bottom surface portion 30 and the front end surface Bp of the burring B can serve as the seal point SP.

Figure 5:
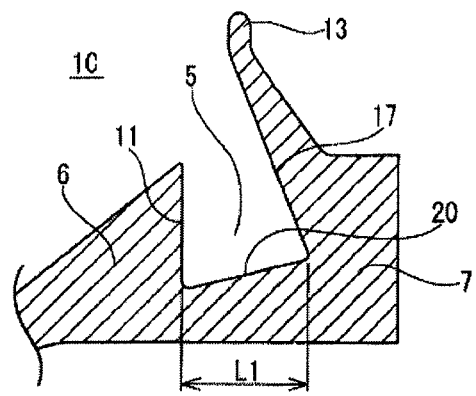
[FIG. 5] An enlarged cross-sectional view of a main portion of a grommet according to a second embodiment of the present invention.
Figure 6A:
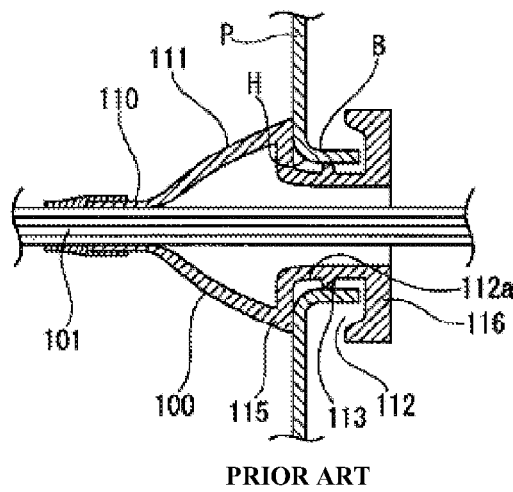
[FIG. 6] (A) (B) (C) A view of a conventional grommet.
Figure 6B:
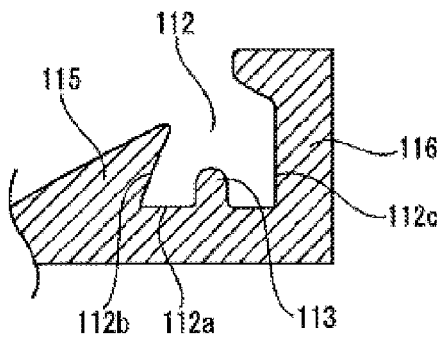
Figure 6C:
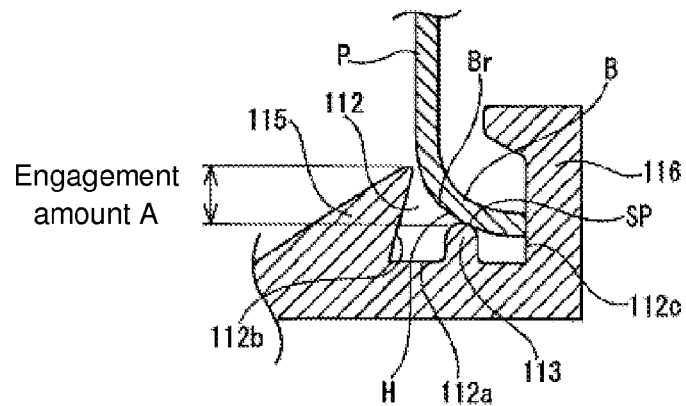
Figure 7A:
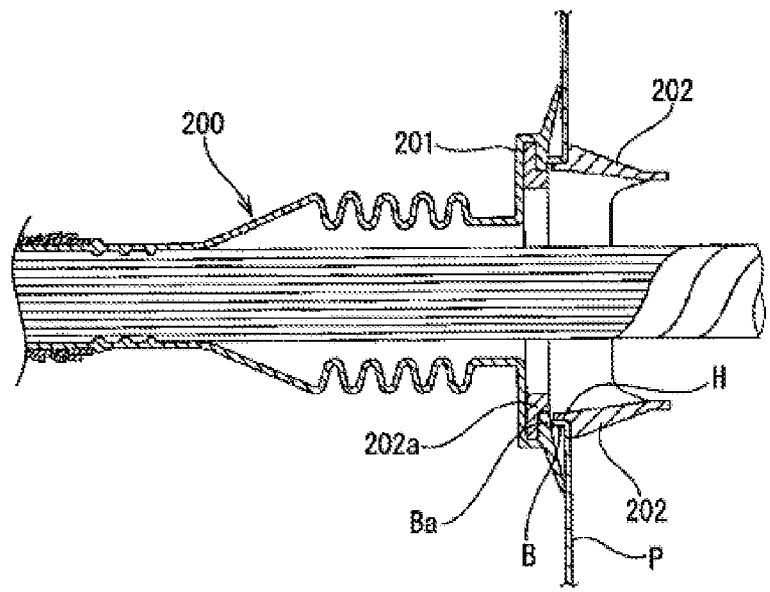
[FIG. 7] (A) (B) A view of another conventional grommet.
Figure 7B:
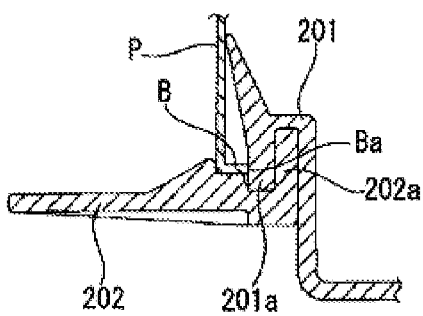

FIG. 5 illustrates a grommet IC according to a second embodiment of the present invention.

In the grommet 1C, a size between two opposing side walls 11 and 17 of a body engagement recess 5 is shorter than a projection amount of a burring B and an inclined bottom surface portion 20 projecting toward the side wall 17 is provided to a bottom surface.

With the configuration above, the burring B can be wedged in and pressed into contact with the inclined bottom surface portion 20 even with a variation in projection length within tolerance, thus achieving stable waterproof performance.

REFERENCE SIGNS LIST

1: Grommet
2: Wire harness
3: Small-diameter tubular portion
4: Diameter-increasing tubular portion
5: Body engagement recess
10: Bottom surface
11: Perpendicular side surface
12: Inclined side surface
20: Inclined bottom surface portion
30: Arcuate bottom surface portion
P: Body panel
H: Through-hole
B: Burring
Bp: Burring front end surface
SP: Seal point

The invention claimed is:

1. A grommet for a wire harness, the grommet configured to be externally fitted to the wire harness routed in a vehicle and mounted to a through-hole from which a burring of a body panel projects, the grommet comprising:
  a one-piece molded component of one of rubber and elastomer; and
  an annular body engagement recess provided in an outer peripheral surface of a tubular portion through which the wire harness is inserted, the body engagement recess being defined by a bottom surface and opposing side surfaces, wherein
  the bottom surface of the body engagement recess is provided with one of an inclined bottom surface portion that is inclined linearly with respect to a longitudinal axis of the tubular portion and an arcuate bottom surface portion that extends arcuately with respect to the longitudinal axis of the tubular portion, wherein the one of the inclined bottom surface portion and the arcuate bottom surface portion projects toward one of the opposing side surfaces of the body engagement recess, and
  the one of the inclined bottom surface portion and the arcuate bottom surface portion is configured to come into wedging and pressing contact with a projecting front end surface of the burring so as to provide a seal point,
  one of the opposing side surfaces of the body engagement recess is defined by a perpendicular side surface extending orthogonal to the longitudinal axis of the tubular portion and the other opposing side surface of the body engagement recess is defined by an inclined side surface having an open end inclined toward the perpendicular side surface, and
  wherein the inclined side surface is spaced from the perpendicular side surface such that the inclined side surface is positioned rearward of the perpendicular side surface with respect to a front end of the tubular portion.

2. The grommet for a wire harness according to claim 1, further comprising a seal lip projecting from an outer end of the inclined side surface toward the perpendicular side surface, and
  the perpendicular side surface is configured to be tightly attached to a surface of a periphery surrounding a through-hole in a body panel and the seal lip is configured to be tightly attached to the periphery surrounding the through-hole in the body panel.

* * * * *